United States Patent
Sakamoto et al.

(10) Patent No.: US 9,146,593 B2
(45) Date of Patent: Sep. 29, 2015

(54) TOUCH PANEL HAVING A WARPED SUBSTRATE AND METHOD FOR MANUFACTURING THE TOUCH PANEL

(71) Applicant: SMK Corporation, Tokyo (JP)

(72) Inventors: Masahide Sakamoto, Toyama (JP); Ryuhei Miyabayashi, Toyama (JP); Ryo Okamura, Kanagawa (JP)

(73) Assignee: SMK Corporation, Tokyo (JP)

( * ) Notice: Subject to any disclaimer, the term of this patent is extended or adjusted under 35 U.S.C. 154(b) by 106 days.

(21) Appl. No.: 14/078,545

(22) Filed: Nov. 13, 2013

(65) Prior Publication Data
US 2014/0354904 A1    Dec. 4, 2014

(30) Foreign Application Priority Data
Jun. 4, 2013 (JP) .................................. 2013-117899

(51) Int. Cl.
G06F 1/16 (2006.01)
G06F 3/041 (2006.01)

(52) U.S. Cl.
CPC .............. G06F 1/169 (2013.01); G06F 3/0412 (2013.01)

(58) Field of Classification Search
CPC ... G06F 1/169; G06F 3/03547; G06F 1/1643; G06F 3/041; G06F 3/0412
See application file for complete search history.

(56) References Cited

U.S. PATENT DOCUMENTS

| 2003/0122792 A1* | 7/2003 | Yamamoto et al. ........... 345/173 |
| 2010/0122900 A1* | 5/2010 | Krasnov .................... 204/192.15 |

FOREIGN PATENT DOCUMENTS

| JP | 2004-280759 A | 10/2004 | |
| JP | 2004280759 A | * 10/2004 | ............. G06F 3/033 |

* cited by examiner

*Primary Examiner* — Larry Sternbane

(57) ABSTRACT

A touch panel is provided, that can prevent, for example, the occurrence of Newton's rings. The touch panel includes: a first substrate having a first principal plane and a second principal plane on which a first transparent conductive film is formed; and a second substrate having a third principal plane on which a second transparent conductive film is formed and a fourth principal plane. The touch panel is configured such that the first substrate and the second substrate are disposed so that the first transparent conductive film and the second transparent conductive film are opposed to each other. The first substrate is warped to be convex from the second principal plane toward the first principal plane.

9 Claims, 14 Drawing Sheets

CLOSER PORTION

TOUCH PANEL HAVING A WARPED SUBSTRATE AND METHOD FOR MANUFACTURING THE TOUCH PANEL

CROSS REFERENCE TO RELATED APPLICATION

The contents of the following Japanese patent application are incorporated herein by reference,
NO. 2013-117899 filed on Jun. 4, 2013.

FIELD

The present invention relates to a touch panel and a method for manufacturing the touch panel.

BACKGROUND

In recent years, mobile devices, cellular telephone devices, and car navigation devices include a display device, such as of liquid crystal display elements, on which a touch panel for enabling operational input thereon is disposed. The touch panel may also be referred to as a touch screen.

Touch panels of various types have been suggested. A typical one of those that have been suggested is a resistance film type touch panel. The resistance film type touch panel is configured such that two transparent conductive films are opposed to each other with a spacer interposed therebetween, the spacer being made of an insulating material such as acrylic resin. The two transparent conductive films serve as an upper electrode and a lower electrode of the touch panel, respectively. The transparent conductive film is formed on a surface of a transparent substrate and made of a material of a high refractive index (for example, about 1.9 to about 2.1) such as indium tin oxide (ITO).

Touch panels such as of the resistance film type may cause a phenomenon called Newton's rings to occur in some cases. Newton's rings are interference fringes that are caused by interference of light in a narrow gap between the upper and lower electrodes of the touch panel. The occurrence of Newton's rings would lead to deterioration in display quality of the display device. Thus, there have been suggestions for preventing the occurrence of Newton's rings. For example, disclosed in Patent Document 1 below is a touch panel in which the laid-around electrode is made greater in thickness than the sealing material so as to curve the upper substrate, thereby preventing the occurrence of Newton's rings.

CITATION LIST

Patent Literature

Patent Literature 1: Japanese Patent Application Publication No. 2004-280759

SUMMARY

Technical Problem

There was a problem with the technique disclosed in Patent Document 1 that since the upper substrate was physically curved, the thickness of the laid-around electrode and the thickness of the sealing material had to be minutely controlled, thus making the process of manufacturing the touch panel complicated.

It is therefore an object of the present invention to provide a touch panel which can solve the aforementioned problems and which is novel and useful, and a method for manufacturing the touch panel.

Solution to Problem

To solve the aforementioned problem, the present invention is implemented as a touch panel. For example, the touch panel can include:
a first substrate having a first principal plane and a second principal plane on which a first transparent conductive film is formed; and
a second substrate having a third principal plane on which a second transparent conductive film is formed and a fourth principal plane, wherein
the first substrate and the second substrate are disposed so that the first transparent conductive film and the second transparent conductive film are opposed to each other; and
the first substrate is warped to be convex from the second principal plane toward the first principal plane.

The present invention is implemented, for example, as a touch panel which includes
a glass substrate formed by a float glass process and provided with a top surface and a bottom surface, with a transparent conductive film formed on the bottom surface.

The present invention is implemented, for example, as a method for manufacturing a touch panel, the touch panel including: a first substrate having a first principal plane and a second principal plane; and a second substrate having a third principal plane and a fourth principal plane, the first and second substrates being opposed to each other, the first substrate being warped to be convex from the second principal plane toward the first principal plane, the method including the step of forming a transparent conductive film on the first principal plane of the first substrate.

Advantageous Effects of Invention

According to at least one embodiment, Newton's rings can be prevented.

DESCRIPTION OF EMBODIMENTS

Now, the present invention will be described in accordance with the embodiments with reference to the attached drawings. The descriptions will be made in the order shown below:
<1. Embodiments>; and
<2. Modified Example>

The embodiments and the like to be described below are preferred specific examples of the present invention, and the contents of the present invention will not be limited to those embodiments and the like. Furthermore, the effects shown in the descriptions below are only illustrative and are not to deny that other effects than those illustrated according to the embodiments and the like of the present invention will be produced.

<1. Embodiments>

First of all, to facilitate understanding the contents of the embodiments, a description will be made to a structure of and a method for manufacturing a typical touch panel. Then, a description will be made to a structure of a touch panel according to the embodiments of the present invention and a manufacturing method thereof. Note that in the descriptions of the structure and the like of the touch panel according to the embodiments, the structure of the typical touch panel and the manufacturing method thereof are also applicable, unless otherwise specified. In this case, like reference symbols refer to the same component, and an overlapped description will be omitted as appropriate.

"An Example of Structure of Typical Touch Panel"

To begin with, a description will be made to an example of the structure of a typical touch panel. The example to be described relates to a touch panel of the so-called resistance film type (the resistance film type touch panel). The resistance film type touch panel may be either an analog resistance film type touch panel or a digital resistance film type touch panel.

Figure 1:
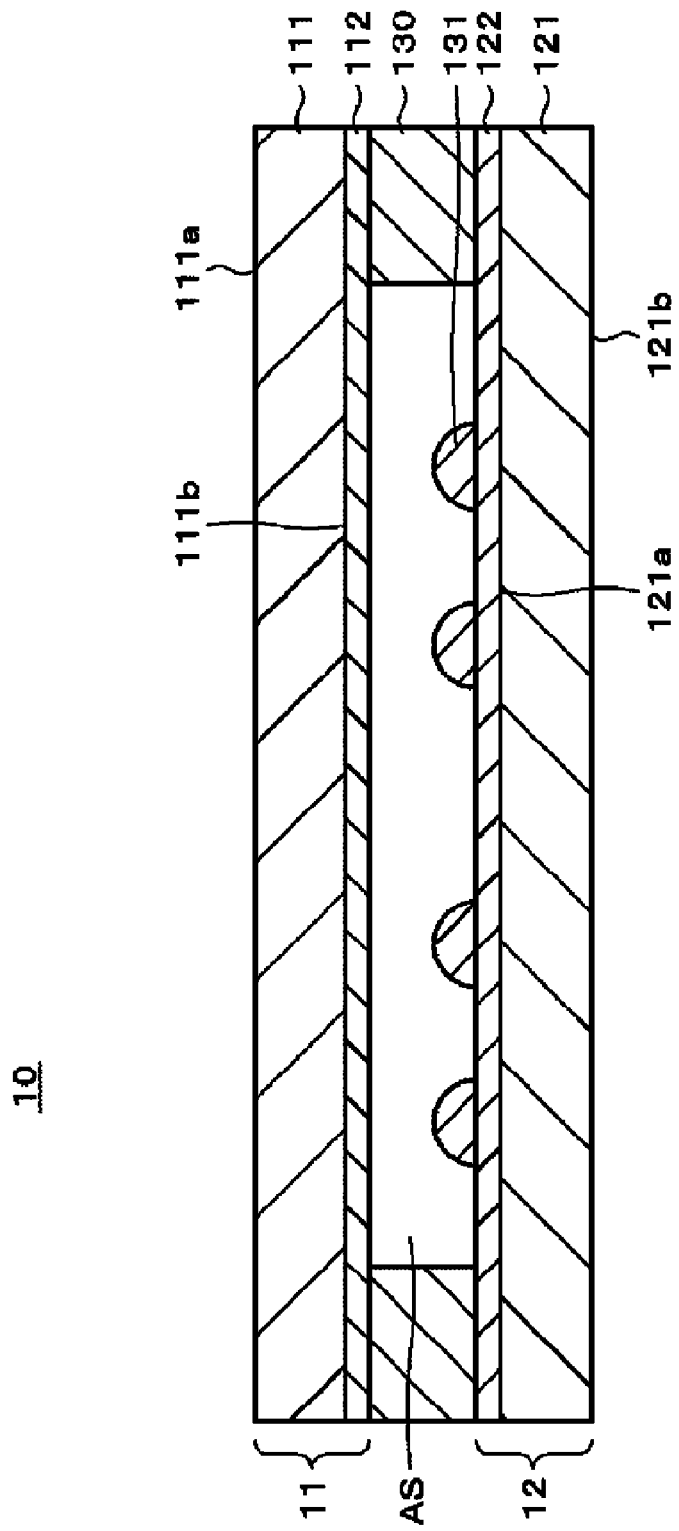
FIG. 1 is a view illustrating an example of the cross-sectional structure of a typical touch panel.

FIG. 1 illustrates an example of the cross-sectional structure of a touch panel 10. The touch panel 10 has a substrate 111 or an example of a first substrate and a substrate 121 or an example of a second substrate. The substrate 111 has a principal plane 111a or an example of a first principal plane and a principal plane 111b or an example of a second principal plane. The substrate 121 has a principal plane 121a or an example of a third principal plane and a principal plane 121b or an example of a fourth principal plane.

On the principal plane 111b of the substrate 111 is formed a transparent conductive film 112 that is an example of a first transparent conductive film. Furthermore, on the principal plane 121a of the substrate 121 is formed a transparent conductive film 122 that is an example of a second transparent conductive film. The substrate 111 and the substrate 121 are disposed so that the transparent conductive film 112 and the transparent conductive film 122 are opposed to each other.

The substrate 111 and the transparent conductive film 112 form a first conductive substrate 11. The substrate 121 and the transparent conductive film 122 form a second conductive substrate 12. The conductive substrate 11 and the conductive substrate 12 are integrally bonded together with a bonding part 130 disposed between their peripheral portions. In a gap (air layer) AS defined between the transparent conductive film 112 and the transparent conductive film 122 there are disposed a plurality of dot spacers 131.

Note that the transparent conductive film 112 is provided, for example, at a predetermined position, with a flexible printed circuit (FPC) board (not shown), thereby enabling electrical communication with an external circuit.

Now, each portion of the touch panel 10 will be described in detail. To begin with, a description will be made to the substrate 111. Note that unless otherwise specified, the substrate 121 can also be described in the same manner and thus an overlapped description will be omitted as appropriate.

The substrate 111 may be, for example, sheet-shaped, block-shaped, or plate-shaped.

As a matter of course, these shapes are only illustrative, and the invention is not limited to those shapes. Note that the sheet shape may include that of film.

The substrate 111 may be, for example, a transparent base material. The substrate 111 to be employed may be made, for example, of well-known glass. A description will be made to this example assuming that among the substrate 111 and the substrate 121, at least the substrate 111 is made of float glass (which may also be referred to as float sheet glass, soda-lime glass, or soda glass.)

The substrate 111 may be made of plastic. The plastic to be employed may be, for example, a well-known polymer material. Examples of the well-known polymer materials may include triacetyl cellulose (TAC), polyester, polyethylene terephthalate (PET), polyethylene naphthalate (PEN), polyimide (PI), polyamide (PA), aramid, polyethylene (PE), polyacrylate, polyether sulfone, polysulfone, polypropylene (PP), diacetyl cellulose, polyvinyl chloride, acrylic resin (PMMA), polycarbonate (PC), epoxy resin, urea resin, urethane resin, melamine resin, cyclic olefin polymer (COP), and norbornene-based thermoplastic resin.

If the substrate 111 is a glass substrate, then the substrate 111 is preferably 20 μm to 10 mm in thickness. If the substrate 111 is a plastic substrate, then the substrate 111 is preferably 20 μm to 500 μm in thickness. As a matter of course, these numerical values are only illustrative, and the invention is not limited to these ranges. The substrate 111 and the substrate 121 may or may not have the same thickness.

Now, a description will be made to the transparent conductive film 112. Note that unless otherwise specified, the transparent conductive film 122 can also be described in the same manner and thus an overlapped description will be omitted as appropriate.

The transparent conductive film 112 may be made, for example, of one or more selected from the group consisting of electrically conductive metal oxide materials, metal materials, carbon materials, and electrically conductive polymers. Examples of the metal oxide materials may include indium tin oxide (ITO), zinc oxide, indium oxide, tin oxide doped with antimony, tin oxide doped with fluorine, zinc oxide doped with aluminum, zinc oxide doped with gallium, zinc oxide doped with silicon, zinc oxide—tin oxide family, indium oxide—tin oxide family, and zinc oxide—indium oxide—magnesium oxide family. The metal materials to be employed may be, for example, metal nanoparticles or metal wire.

Specific examples of these materials may include metals such as copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead; or an alloy of these substances.

Examples of the carbon materials may include carbon black, carbon fiber, fullerene, graphene, carbon nanotube, carbon micro coil, and nanohorn.
Examples of the electrically conductive polymers to be employed may include substituted or non-substituted polyaniline, polypyrrole, polythiophene, and a (co)polymer made of one or two types of those selected from this group.

The transparent conductive film 112 may be made, for example, by physical vapor deposition (PVD) such as sputtering, vacuum vapor deposition, and ion plating; by chemical vapor deposition (CVD); by coating; or by printing.

The bonding part 130 to be employed may be, for example, an adhesive paste or an adhesive tape. The dot spacers 131 may be formed, for example, in a generally semi-spherical shape and disposed on the surface of the transparent conductive film 122. The dot spacers 131 are made of, for example, an acrylic urethane resin. The number and the arrangement of the dot spacers 131 may be set, as appropriate, depending on the structure of the touch panel 10.

Figure 2:
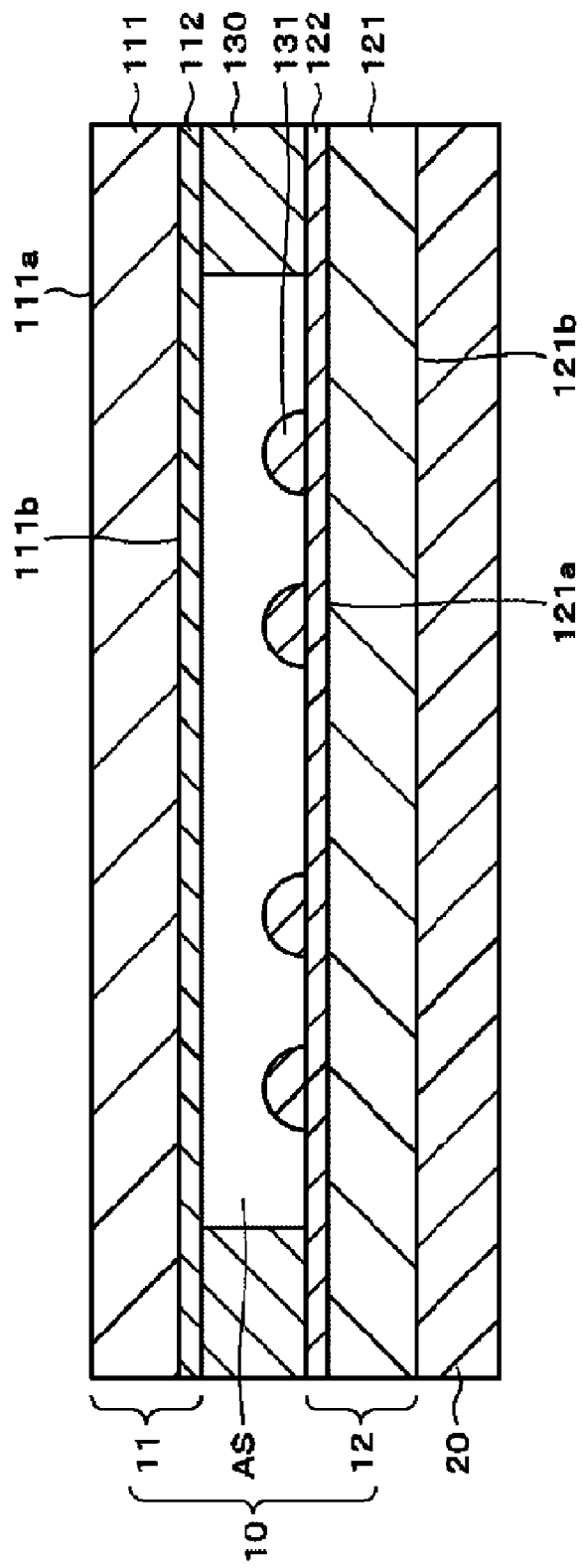
FIG. 2 is a view illustrating an example of the cross-sectional structure of a typical touch panel and a display device integrated with the touch panel.

As shown in FIG. 2, the touch panel 10 is bonded to a display device 20 with a bonding layer (not shown) therebetween. More specifically, the display device 20 is bonded to the principal plane 121b of the substrate 121. The bonding layer may be made of, for example, an acrylic-based, rubber-based, or silicon-based adhesive. From the viewpoints of transparency, the acrylic-based adhesive is preferable.

The display device 20 may be, for example, a liquid crystal display, cathode ray tube (CRT) display, plasma display panel (PDP), electro luminescent (EL) display, or light emitting diode (LED) display.

"An Example of Touch Panel in Use"

Figure 3:
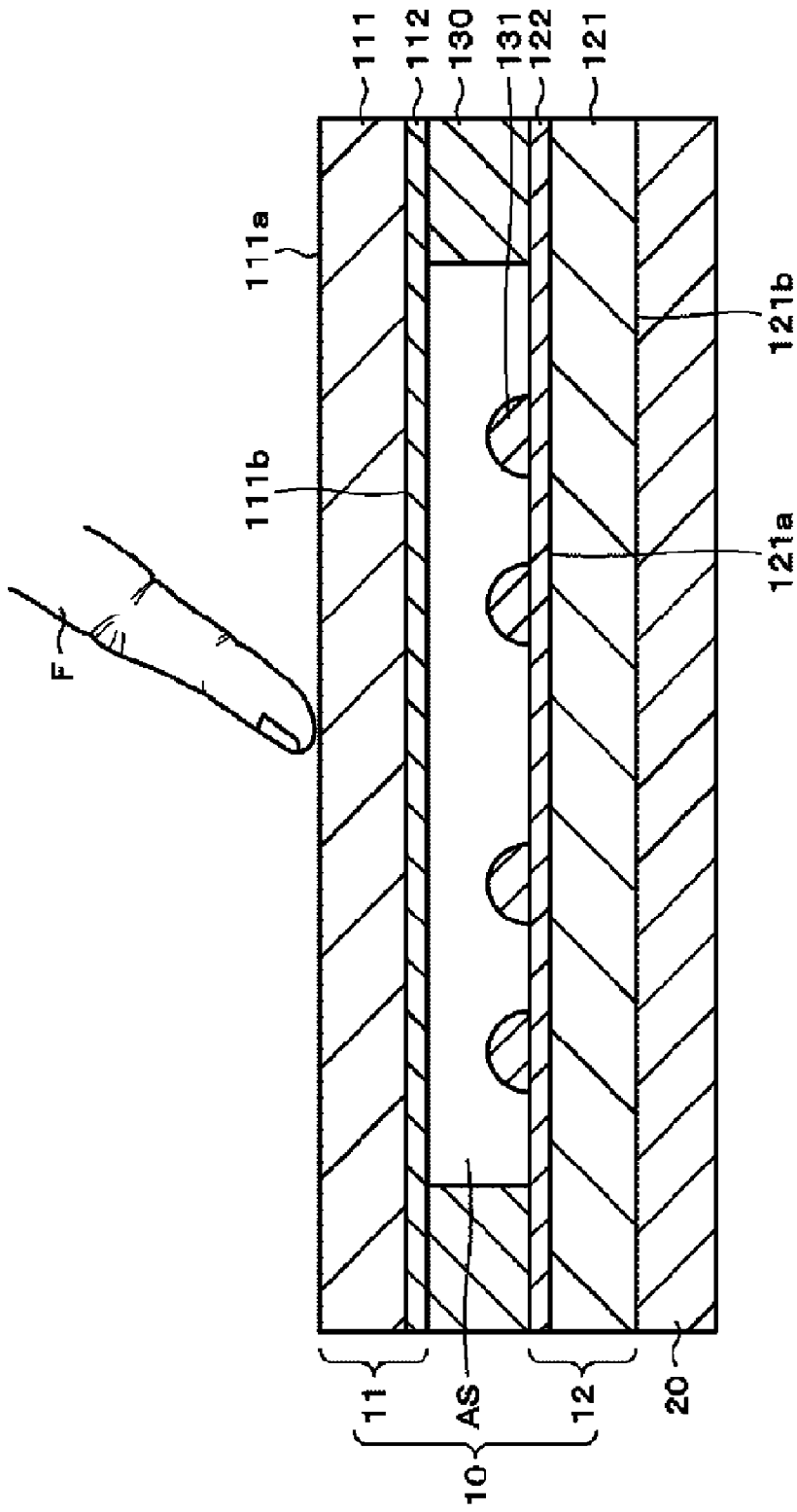
FIG. 3 is a view illustrating an example of a touch panel in use.

FIG. 3 is a view illustrating an example of the touch panel 10 in use. As shown in FIG. 3, the user can provide operational input using a user's finger F on the touch panel 10. More specifically, operational input can be provided using the finger F on the principal plane 111a of the substrate 111. Note that operational input on the touch panel 10 may be provided not only by a finger but also with a tool like a stylus pen.

Since operational input is provided to the principal plane 111a as described above, the principal plane 111a may be preferably provided with a hard coat layer from the viewpoints of improving resistance to abrasion.
Furthermore, soil-resistance may preferably be imparted to the surface of the hard coat layer. The operational input on the hard coat layer formed on the principal plane 111a is also included in the operational input on the principal plane 111a.

"An Example of Operation of Touch Panel"

Now, a description will be made to an example of the operation of the touch panel 10. Here, the description will be made assuming that the touch panel 10 is a four-wire resistance film type touch panel.

The substrate 111 is provided with a plurality of transparent conductive films 112 (an upper electrode). The substrate 121 is provided with the transparent conductive film 122 (a lower electrode) so as to be generally orthogonal to the transparent conductive film 112. Typically, the upper and lower electrodes are kept separated and electrically isolated from each other.

Depending on operational input (touch operation) on the principal plane 111a, the upper and lower electrodes located at the point of the operational input are brought into contact with each other, allowing a current to flow therebetween. By determining the pair of conducting electrodes, the coordinates of the intersection, that is, the position of the point of operational input is determined.

As a matter of course, the touch panel 10 is not limited to the four-wire type but may also be a five-wire, six-wire, or eight-wire resistance film type touch panel, which is an improved version of the four-wire. The touch panel 10 operates in accordance with those schemes.

"An Example of Method for Manufacturing Touch Panel"

Figure 4A:
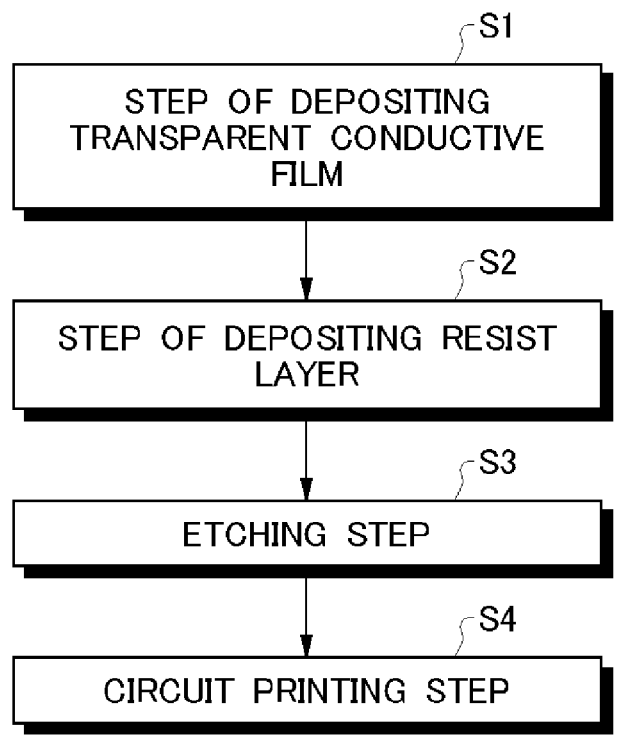
FIGS. 4A and 4B are views showing an example of a method for manufacturing a typical touch panel.
Figure 4B:
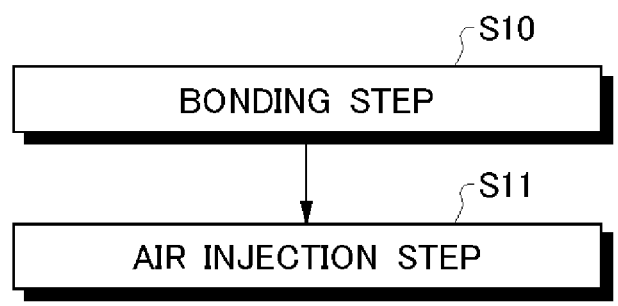

Referring to FIGS. 4A and 4B, a description will be made to an example of a method for manufacturing the touch panel 10. Note that in the following descriptions, the main steps of the method for manufacturing the touch panel 10 will be described. However, it is not intended to exclude any step other than those that will not be mentioned here.

To begin with, referring to FIG. 4A, a description will be made to an example of a method for manufacturing the conductive substrate 11. Note that since the conductive substrate 12 can be manufactured generally in the same manner as the conductive substrate 11, a method for manufacturing the conductive substrate 12 will not be repeatedly explained, unless otherwise specified.

In step S1, the step of depositing a transparent conductive film is performed, so that the transparent conductive film 112 is formed on the principal plane 111b of the substrate 111. The transparent conductive film 112 can be formed, for example, by CVD (a technique for precipitating thin film out of a vapor-phase gas with the help of chemical reaction) such as thermal CVD, plasma CVD, or optical CVD, as well as by PVD (a technique for aggregating a material physically vaporized in a vacuum onto a substrate so as to form a thin film) such as vacuum vapor deposition, plasma aided vapor deposition, sputtering, or ion plating.

In step S2 that follows, the resist layer deposition step is performed, so that a resist layer is formed on the surface of the transparent conductive film 112. The resist layer may be made of an organic resist such as novolac-based resist or chemically amplified resist.

In step S3 that follows, an etching step is performed. The etching to be employed may be, for example, wet etching. In the etching step, an unnecessary part of the transparent conductive film 112 is removed, so that a plurality of transparent conductive films are formed, for example, in a rectangular shape. Then, the resist layer is removed. Note that to create the conductive substrate 12, for example, the etching step is performed, and thereafter, the dot spacers 131 are formed by printing and baking.

In step S4 that follows, a circuit printing step is performed. In the circuit printing step, for example, silver ink is printed at predetermined points of an electrically conductive film pattern and then heated, thereby forming a circuit extended from the transparent conductive film 112. Note that as required, an insulating ink may be printed around the transparent conductive film and then coated.

In a bonding step in step S10 shown in FIG. 4B, the conductive substrate 11 and the conductive substrate 12 are bonded together with the bonding part 130 therebetween. More specifically, after the conductive substrate 11 and the conductive substrate 12 are positioned, a predetermined pressure is applied to the conductive substrate 11, allowing the conductive substrate 11 and the conductive substrate 12 to be bonded together.

In an air injection step in step S11 that follows, to correct the gap between the conductive substrate 11 and the conductive substrate 12, air is injected into the gap. In this step, the gap is corrected, thereby preventing the occurrence of Newton's rings.

"An Example of Method for Manufacturing Substrate"

As described above, in an embodiment, the substrate 111 is formed of float glass. The float glass refers to the glass that is created by a manufacturing method called as a float glass process.

Figure 5:
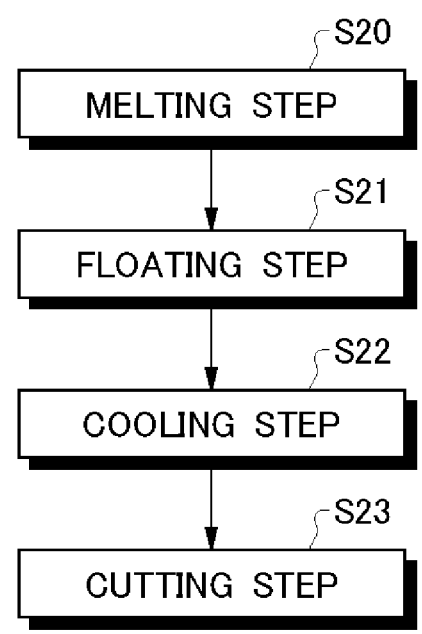
FIG. 5 is a view illustrating an example of a method for manufacturing a glass substrate.

FIG. 5 shows major steps in the float glass process. In step S20, a melting step is performed. In the melting step, glass materials such as silica sand, soda-ash, and limestone are heated at a high-temperature (for example, 1600° C. or higher) to melt and mix the glass materials.

In step S21 that follows, a floating step is performed. In the floating step, the molten glass materials are allowed to flow into a bath (floating bath) in which molten metal has been stored. The molten metal may be, for example, tin (Sn). Here, since glass has a specific gravity less than that of tin, the glass materials drawn into the floating bath are floated on top of the tin. By doing so, the glass materials are formed to have a given width and a given thickness.

In step S22 that follows, a cooling step is performed. In the cooling step, the glass material having flown on top of the tin is fed to a cooling line so as to be gradually cooled. In the cooling step, the glass materials are solidified.

In step S23 that follows, a cutting step is performed. In the cutting step, the glass materials that have been solidified in step S22 are cut in an appropriate size.

Figure 6:
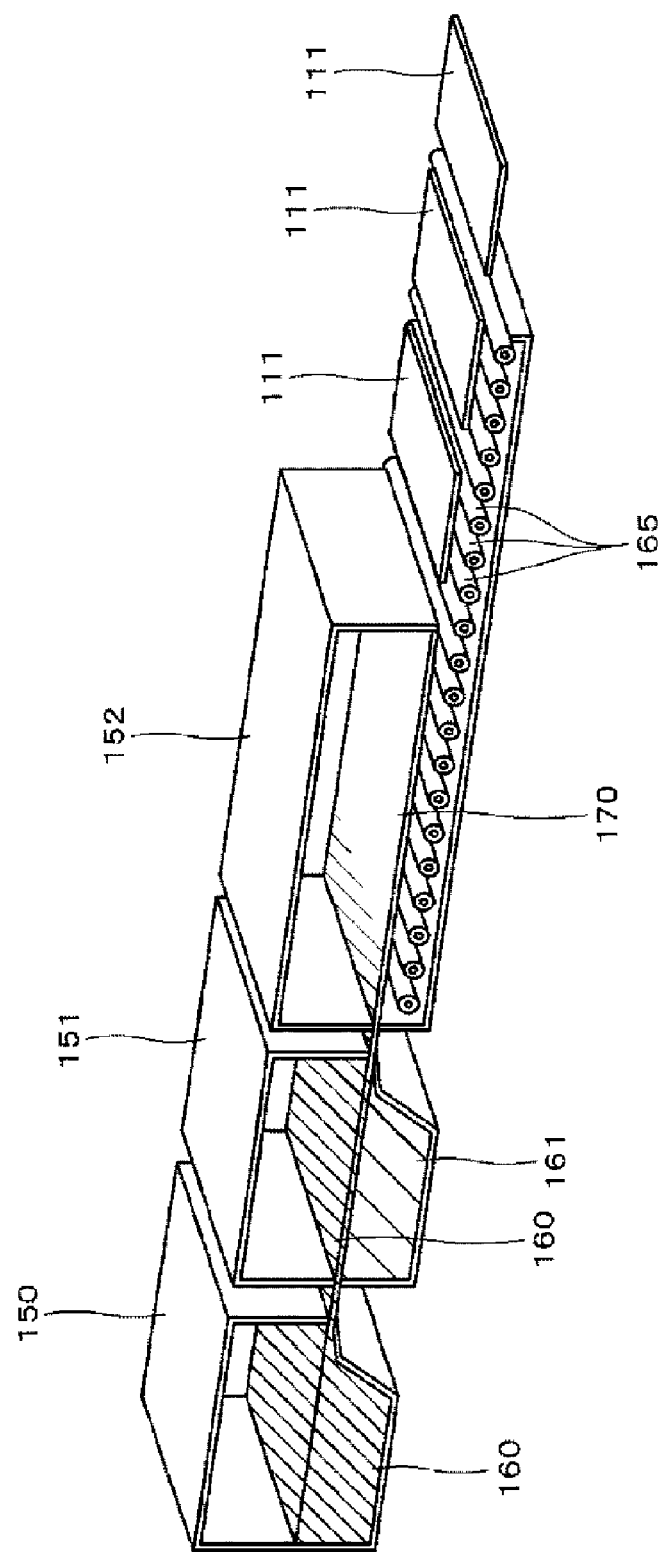
FIG. 6 is an explanatory view illustrating an example of a method for manufacturing a glass substrate.

FIG. 6 shows an example of a manufacturing line for a float glass process. In the melting step, the glass materials are allowed to flow into a melting bath 150. The glass materials are heated in the melting bath 150 so as to produce molten glass material 160. The molten glass material 160 is fed to a floating bath 151.

In the floating bath 151, molten tin 161 is stored. Since glass has a specific gravity less than that of tin as described above, the glass material 160 flows on top of the tin 161. Then, the glass material 160 is fed to a cooling furnace 152. In the cooling furnace 152, the glass material 160 is gradually cooled, so that the glass material 160 is solidified and formed into glass 170. After the glass 170 is drawn out of the cooling furnace 152 on rollers 165 or the like, the glass 170 is cut in an appropriate size into the substrate 111. Note that the substrate 121 is also formed in the same manner.

The substrate 111 created by the floating method has a surface that was in contact with tin and thus has a thin layer of tin thereon. This surface is called a bottom surface (the tin surface). On the other hand, the surface opposite to the bottom surface, that is, the surface that was not in contact with tin is called a top surface (the non-tin surface).

"Problem Caused by Warpage of Glass Substrate"

Figure 7:
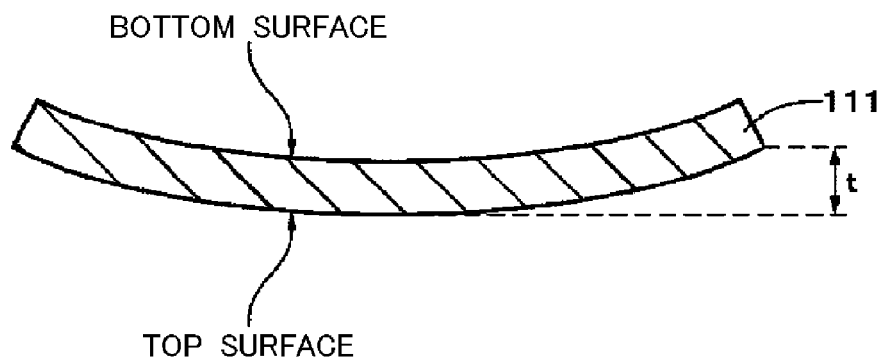
FIG. 7 is an explanatory view illustrating an example of warpage of a glass substrate.

The float glass process makes it possible to create a glass substrate which is reduced in strain and warpage. However, the warpage cannot be completely reduced to zero due to various factors in each step such as the cooling step. That is, the substrate 111 is not as flat as shown in FIG. 1, but in fact, as shown in FIG. 7, warped so as to be convex from the bottom surface toward the top surface. The warpage t of the glass substrate is, for example, approximately 0.1 mm (millimeter).

Figure 8:
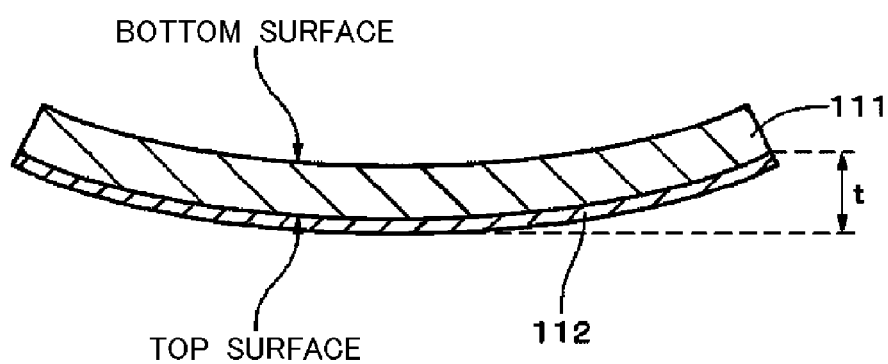
FIG. 8 is an explanatory view illustrating an example of deposition of a transparent conductive film on a glass substrate.

Conventionally, in the step of depositing transparent conductive film, the warped shape of the glass substrate has not been taken into consideration. Thus, as illustrated in FIG. 8, the glass substrate 111 may be provided, on the top surface thereof, with the transparent conductive film (for example, ITO film) 112. In this case, the top surface of the substrate 111 corresponds to the principal plane 111a, while the bottom surface of the substrate 111 corresponds to the principal plane 111b. Note that when the ITO film is employed as the transparent conductive film, the deposition step thereof is typically performed by sputtering in an environment at about room temperature. It is known that the ITO film deposited in such a step is given tensile stress as a physical property. In this case, the tensile stress of the ITO film causes a further increase in the warpage t of the glass substrate.

Figure 9:
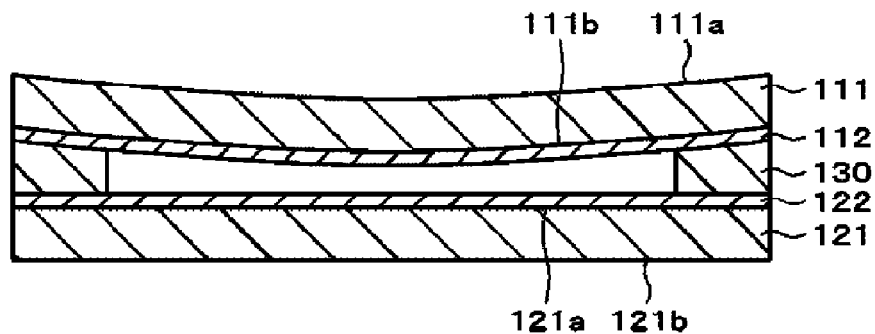
FIG. 9 is an explanatory view illustrating an example of a warped glass substrate applied to a touch panel.

Then, in the bonding step, the warped glass substrate 111 is bonded to the glass substrate 121 as illustrated in FIG. 9. That is, the substrate 111 is bonded to the substrate 121 in a manner such that the substrate 111 is convex toward the substrate 121. Note that the dot spacers 131 are not illustrated, as appropriate, in FIG. 9 (also in the subsequent figures).

Figure 10A:
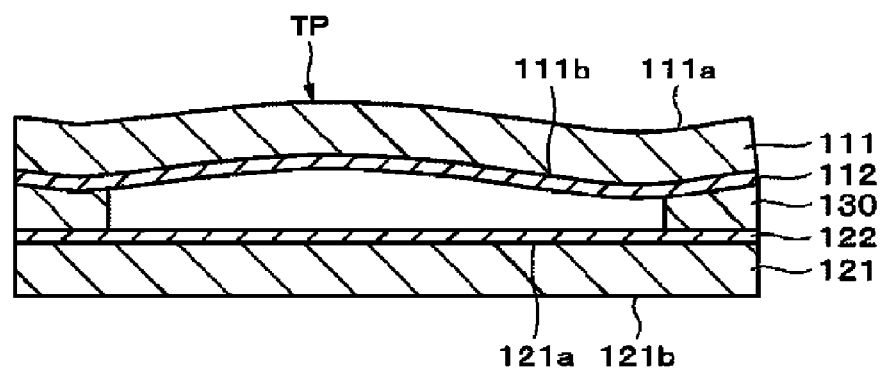
FIG. 10A is an explanatory view illustrating an example of a typical touch panel after air has been injected therein.

After the substrate 111 and the substrate 121 are bonded together, air is injected into the gap in the air injection step. FIG. 10A schematically shows the touch panel into which air has been injected. The touch panel into which air has been injected is configured such that a top portion TP of the substrate 111 appears at a position displaced from the center of the substrate 111.

Figure 10B:
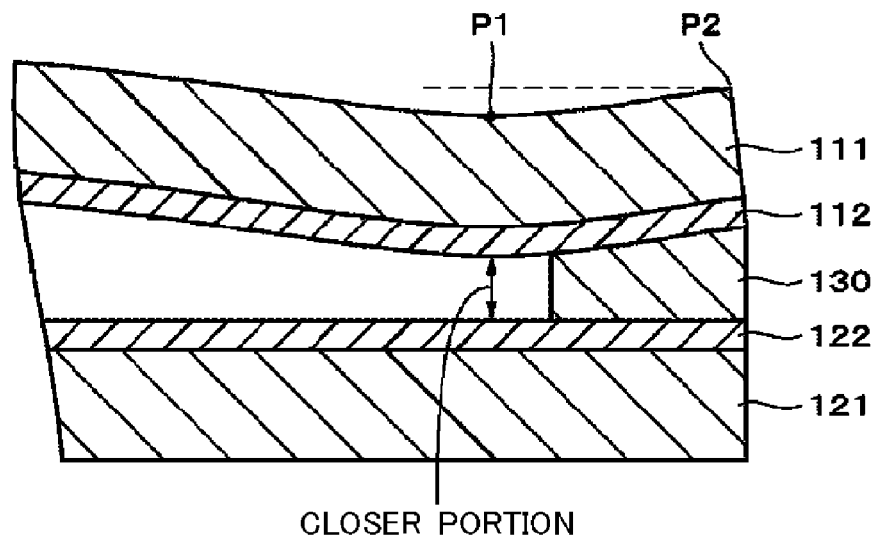
FIG. 10B is an explanatory view illustrating an example of the peripheral portion of the touch panel after air has been injected therein.

FIG. 10B is an enlarged view of the peripheral portion of the touch panel. The touch panel has an inward tilt that is produced in the peripheral portion in particular. The inward tilt refers to the phenomenon that the inside of the touch panel is lower than the outside (the peripheral side). In FIG. 10B, for example, an arbitrary point P1 of the glass substrate 111 is lower than a point P2 that is located outside the point P1, thus causing the inward tilt to be produced. In the vicinity of the point P1 at which the inward tilt is produced, the transparent conductive film 112 and the transparent conductive film 122 are brought into close proximity to each other, causing Newton's rings therearound.

Figure 11:
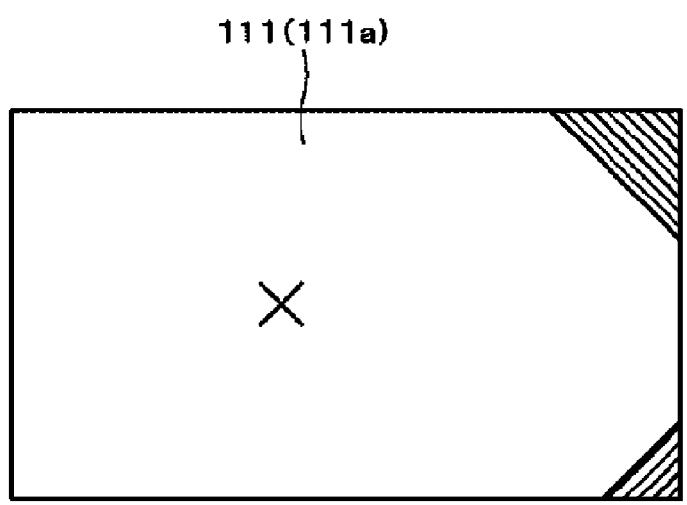
FIG. 11 is an explanatory view illustrating an example of a point of occurrence of Newton's rings.

FIG. 11 is a view showing examples of the position of the top portion TP of the substrate 111 and the position at which Newton's rings are produced after the injection of air. The point indicated with "x" shows the example position of the top portion TP, while the diagonally shaded areas show an example position at which Newton's rings tend to occur.

The top portion TP frequently appears at a position displaced from the center of the principal plane 111a of the substrate 111. At a peripheral portion of the substrate 111 away from the top portion TP, Newton's rings occur. As a matter of course, these positions are only illustrative, and the position of the top portion TP and the position at which Newton's rings occur are not uniquely determined.

That is, when the substrate 111 and the substrate 121 are bonded together causing the substrate 111 to be convex relative to the substrate 121, the warped shape of the substrate 111 causes the inward tilt to occur. This inward tilt in turn leads to the occurrence of Newton's rings.

"An Example of Structure of Touch Panel According to the Present Invention"

Figure 12:
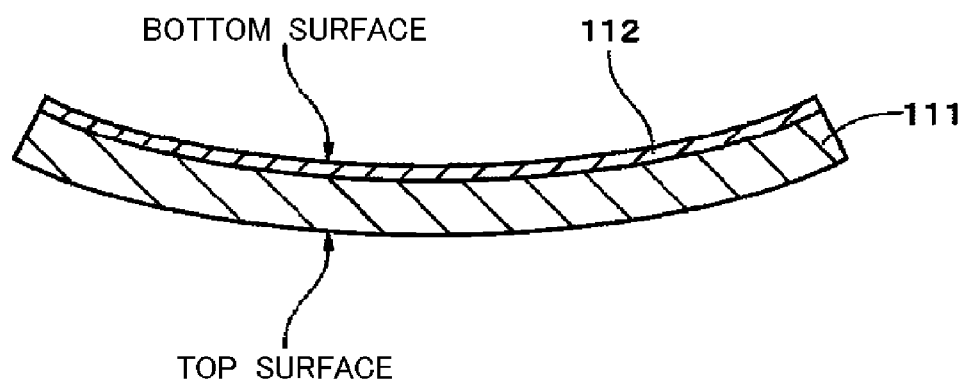
FIG. 12 is an explanatory view illustrating an example of deposition of a transparent conductive film on a glass substrate according to an embodiment of the present invention.

In this context, an embodiment of the present invention is implemented, by way of example, such that the transparent conductive film 112 is formed on the bottom surface of the substrate 111 as shown in FIG. 12. The tensile stress of the transparent conductive film 112 causes a slight reduction in the warpage of the substrate 111.

Figure 13A:
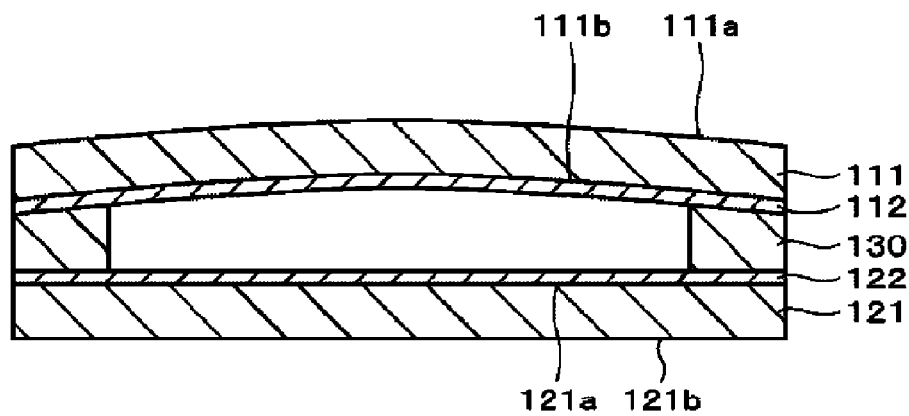
FIG. 13A is an explanatory view illustrating an example of a touch panel according to an embodiment of the present invention after air has been injected therein.

FIG. 13A is a view illustrating an example of the substrate 111 and the substrate 121 which have been bonded together in the bonding step. That is, the substrate 111 and the substrate 121 are bonded together so that the substrate 111 is convex from the bottom surface toward the top surface.

Figure 13B:
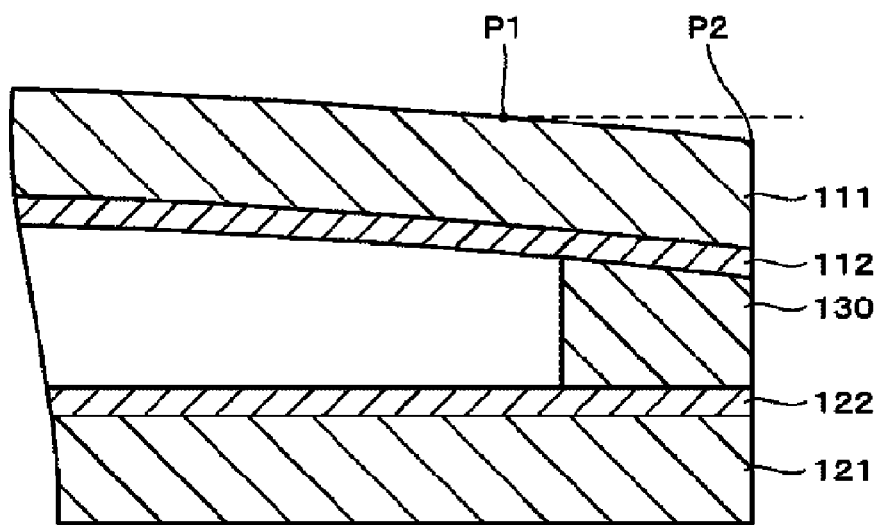
FIG. 13B is an explanatory view illustrating an example of a peripheral portion of the touch panel after air has been injected therein.

Subsequently to the bonding step, the air injection step is performed. Even when air has been injected in the air injection step, the top portion TP of the substrate 111 occurs generally at the center of the substrate 111. That is, such a status that the inside of the touch panel is higher than the outside is sustained. As shown in FIG. 13B, the point P1 of the substrate 111 is located higher than the point P2 that is outside the point P1, thus causing no inward tilt to occur on the peripheral portion of the substrate 111. Since no inward tilt occurs, it is possible to prevent the occurrence of Newton's rings.

Figure 14:
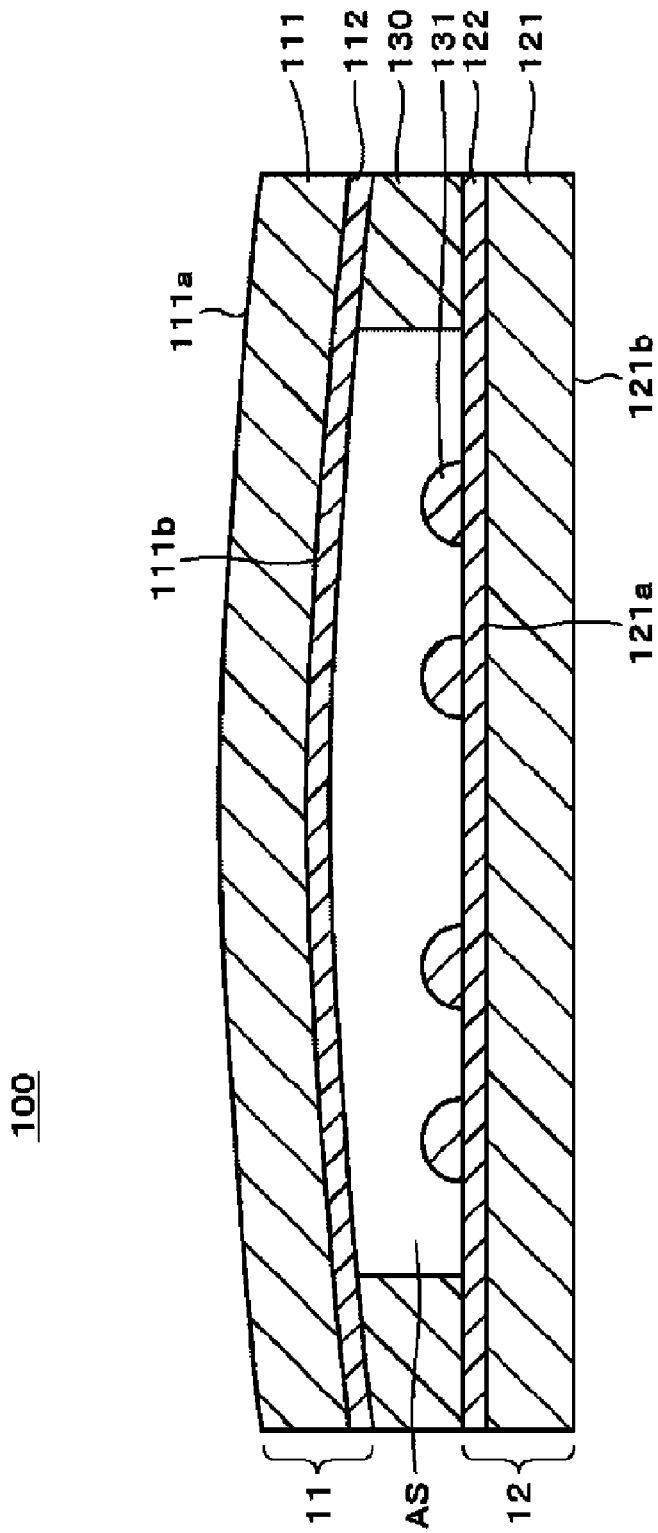
FIG. 14 is a view illustrating an example of the cross-sectional structure of a touch panel according to an embodiment of the present invention.

FIG. 14 shows an example of the cross-sectional structure of a touch panel 100 according to an embodiment of the present invention. Like the touch panel 10, the touch panel 100 is configured such that the substrate 111 and the substrate 121 are disposed so that the transparent conductive film 112 and the transparent conductive film 122 are opposed to each other. The substrate 111 is warped to be convex from the principal plane 111b (the bottom surface) toward the principal plane 111a (the top surface). In other words, the substrate 111 is warped to be convex in a direction opposite to the substrate 121.

Figure 15:
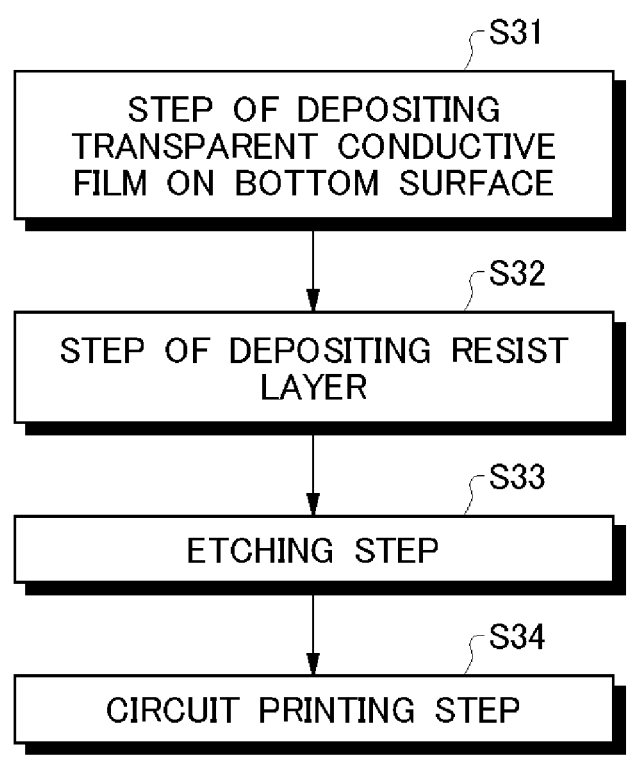
FIG. 15 is a view illustrating an example of a method for manufacturing a touch panel according to an embodiment of the present invention.

FIG. 15 shows an example of a method for manufacturing the touch panel 100. In step S31, the transparent conductive film 112 is formed on the principal plane 111b of the substrate 111, that is, the bottom surface of the substrate 111. The transparent conductive film 112 can be formed by the method illustrated in the description of step S1 of FIG. 4A.

Other steps (a resist deposition step S32, an etching step S33, and a circuit printing step S34) have the same contents as those of the resist deposition step S2, the etching step S3, and the circuit printing step S4 of FIG. 4, and thus overlapped descriptions will be omitted. The substrate 111 obtained through the steps shown in FIG. 15 is bonded to the substrate 121 in the bonding step. Then, in the air injection step, air is injected into the gap defined between the substrate 111 and the substrate 121 so as to correct the gap.

Figure 16:
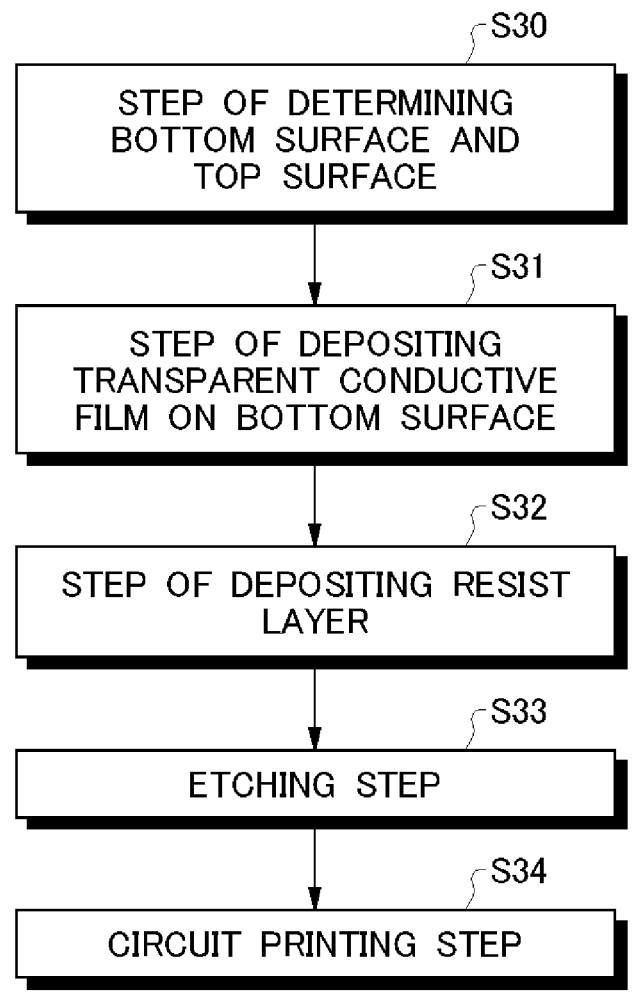
FIG. 16 is a view illustrating another example of a method for manufacturing a touch panel according to an embodiment of the present invention.

Note that as shown in FIG. 16, as a step preceding step S31, it is also acceptable to add a determination step (step S30) of determining whether the principal plane of the substrate 111 is the bottom surface or the top surface.

Methods for determining the bottom and top surfaces of the substrate 111 may include, for example, a method for irradiating the substrate 111 with short-wavelength ultraviolet light. The glass substrate manufactured by the floating method has a thin layer of tin on the surface that was in contact with tin, that is, the bottom surface. By irradiating the glass substrate with ultraviolet light, no change is noticed on the top surface, but the glass substrate with white turbidness is observed on the bottom surface.

This phenomenon is caused by the fact that the glass substrate has a reduced tendency to pass therethrough ultraviolet light, for example, at 300 nm (nanometer) or less. That is, this phenomenon is observed because irradiating the tin-coated bottom surface with ultraviolet light causes the tin to emit fluorescent light, whereas irradiating the top surface with ultraviolet light causes the ultraviolet light to be absorbed by the glass without reaching the tin.

The phenomenon caused by the irradiation with ultraviolet light is observed by a person or machine, thereby determining whether the surface of the glass substrate is the top surface or the bottom surface. Then, on the basis of the determination result, the step of depositing a transparent conductive film is performed, in step S31 that follows, on the principal plane that has been determined to be the bottom surface.

Note that methods for determining whether the surface is the top surface or the bottom surface is not limited to the method that employs the irradiation with ultraviolet light. For example, the top surface and the bottom surface can be determined by observing the section of the glass substrate. Furthermore, a well-known method other than the illustrated method may also be employed.

According to an embodiment of the present invention, it is possible to prevent, for example, the occurrence of the inward tilt in the process of manufacturing the touch panel. This makes it possible to prevent the occurrence of Newton's rings that would be otherwise caused by the inward tilt, thus providing a touch panel that is improved in display quality. Furthermore, it is not necessary to minutely control the thickness of individual members that constitute the touch panel or to add a new arrangement to the touch panel.

<2. Modified Example>

While the present invention has been described above in accordance with the embodiments, the present invention is not limited to the embodiments mentioned above, but may be modified in a variety of ways.

In the embodiment described above, the resistance film type touch panel was taken as an example. However, the invention is not limited thereto. The present invention is also applicable to a touch panel having a structure with a gap layer or a touch panel with the gap layer that has to be made uniform.

In the embodiment described above, glass was taken as an example of a material of the substrate. However, the invention is also applicable to a substrate of film so long as the substrate is warped. Furthermore, in the embodiment, one substrate (substrate 111) was described to be warped. However, the invention is applicable in the same manner even to the case where the other substrate (substrate 121) is warped or both the substrates are warped.

The structures, methods, steps, shapes, materials, and numerical values in the embodiments and modified example above are only illustrative, and thus other different structures, methods, steps, shapes, materials, and numerical values may also be employed as required. Furthermore, the structures, methods, steps, shapes, materials, and numerical values in the embodiments and modified example may be combined with each other within the range in which no technical contradiction arises.

Furthermore, the present invention may be implemented not only in the form of a device but also in the form of, for example, a method, a program, or a recording medium on which the program is stored.

REFERENCE SIGNS LIST

100 Touch panel
111, 121 Substrate
111a, 111b Principal plane
121a, 121b Principal plane
112, 122 Transparent conductive film
131 Dot spacer

The invention claimed is:
1. A touch panel comprising:
a first substrate having a first principal plane that is a top surface and a second principal plane that is a bottom surface on which a first transparent conductive film is formed;
a second substrate having a third principal plane on which a second transparent conductive film is formed and a fourth principal plane; and a bonding portion that bonds together the first substrate and the second substrate to integrally form the first substrate and the second substrate, wherein the first substrate and the second substrate are disposed so that the first transparent conductive film and the second transparent conductive film are opposed to each other;

the first substrate is a glass substrate made by a float glass process and is warped to be convex from the second principal plane toward the first principal plane; and when an operational input is not provided to the touch panel, the first substrate is supported only by the bonding portion above the second substrate.

2. The touch panel according to claim 1, wherein the first transparent conductive film and the second transparent conductive film include an indium tin oxide.

3. The touch panel according to claim 1, wherein the first principal plane is configured to receive the operational input.

4. The touch panel according to claim 1, wherein a dot spacer is disposed in a gap formed between the first transparent conductive film and the second transparent conductive film opposed to each other.

5. The touch panel according to claim 1, wherein the bonding portion is made of an insulating material.

6. A method for manufacturing a touch panel, the touch panel including: a first substrate having a first principal plane and a second principal plane; and a second substrate having a third principal plane and a fourth principal plane, the first and second substrates being opposed to each other, the method comprising:

producing the first substrate by a production process;

determining whether a principal plane of the first substrate is the first principal plane or the second principal plane such that a direction in which the first substrate is warped to be convex due to the production process is from the second principal plane toward the first principal plane; and forming a transparent conductive film on the determined second principal plane of the first substrate.

7. The method for manufacturing a touch panel according to claim 6, wherein the production process is a float glass process.

8. The method for manufacturing a touch panel according to claim 7, wherein said determining includes determining whether the principal plane was in contact with tin in the float glass process.

9. A method for manufacturing a touch panel, comprising:

producing, with a float glass process, a first substrate that is a glass substrate and is warped to be convex from a second principal plane that is a bottom surface toward a first principal plane that is a top surface;

forming a first transparent conductive film on the second principal plane of the first substrate; and bonding together the first substrate and a second substrate, the second substrate having a third principal plane on which a second transparent conductive film is formed and a fourth principal plane, with a bonding portion to integrally form the first substrate and the second substrate such that the first transparent conductive film and the second transparent conductive film are opposed to each other.

\* \* \* \* \*